United States Patent [19]
Imai

[11] Patent Number: 5,742,566
[45] Date of Patent: Apr. 21, 1998

[54] OPTICAL RECORDING METHODS AND APPARATUS USING LIGHT MODULATION TECHNIQUE BASED ON DETECTING TEMPERATURE OF THE MEDIUM

[75] Inventor: Mitsugu Imai, Kanagawa, Japan

[73] Assignee: Sony Corporation, Tokyo, Japan

[21] Appl. No.: 756,157

[22] Filed: Nov. 25, 1996

[30] Foreign Application Priority Data

Nov. 27, 1995 [JP] Japan ................................. 7-331158

[51] Int. Cl.⁶ ............................................... G11B 11/00
[52] U.S. Cl. ........................................ 369/13; 369/116
[58] Field of Search ............................ 369/13, 116, 59, 369/120, 14; 300/59, 114; 365/122

[56] References Cited

U.S. PATENT DOCUMENTS

| | | | |
|---|---|---|---|
| 5,182,734 | 1/1993 | Watanabe et al. | 369/13 |
| 5,182,742 | 1/1993 | Ohmori et al. | 369/116 |
| 5,297,128 | 3/1994 | Yamaguchi et al. | 369/116 |
| 5,323,374 | 6/1994 | Arai et al. | 369/116 |
| 5,329,512 | 7/1994 | Fukimoto et al. | 369/13 |
| 5,461,603 | 10/1995 | Otsuka | 369/120 |
| 5,513,165 | 4/1996 | Ide et al. | 369/116 |
| 5,625,616 | 4/1997 | Koike et al. | 369/116 |

FOREIGN PATENT DOCUMENTS

| | | |
|---|---|---|
| 6-150435 | 5/1994 | Japan . |
| 6-162591 | 6/1994 | Japan . |
| 6-318348 | 11/1994 | Japan . |
| 7244885 | 9/1995 | Japan . |

*Primary Examiner*—Tan Dinh
*Attorney, Agent, or Firm*—Limbach & Limbach L.L.P.

[57] ABSTRACT

In an optical recording a shape of a mark which is a data recording area can be formed into a desired shape even if a temperature of an optical recording medium changes. The present invention provides a temperature detecting means for detecting the temperature of the optical recording medium and a laser power adjusting means for adjusting first laser power and second laser power on the basis of the detected temperature, and the mark is recorded in the optical recording medium by using the adjusted first laser power and the adjusted second laser power. Thereby, even if the temperature of the optical recording medium changes with influence of environmental temperature, a recording operation can be performed with an optimum laser power determined based upon the temperature of the optical recording medium. Thus, even if the temperature of the optical recording medium changes, the shape of the mark which is the data recording area can be formed into the desired shape.

8 Claims, 7 Drawing Sheets

OPTICAL RECORDING METHODS AND APPARATUS USING LIGHT MODULATION TECHNIQUE BASED ON DETECTING TEMPERATURE OF THE MEDIUM

BACKGROUND OF THE INVENTION

1. Field of the Invention

This invention relates to an optical recording apparatus, and more particularly, is applicable to a magneto-optical disc apparatus for recording recording data in a magneto-optical disc by using a laser beam.

2. Description of the Related Art

In a magneto-optical disc apparatus, a magnetic field is applied and a temperature of a magnetic film of a magneto-optical disc is raised to reach or exceed a Curie point by radiating a laser beam on the magneto-optical disc, thereby an inverted magnetized area (that is, a mark) based on recording data is formed on the magnetic film in order to record data.

In this type of the magneto-optical disc apparatus, there are two kinds of modulation systems on recording. One is a light modulation system for varying a laser beam according to the recording data. The other is a magnetic field modulation system for varying a magnetic field according to the recording data.

In addition, in the magneto-optical disc apparatus, there are two kinds of mark forming methods on recording. One is a mark length recording method (that is, a mark-edge recording method) for recording a mark having a length determined based on the recording data, the other is am ark space recording method for varying a position of am ark to be record according to the recording data. In this connection, on reproducing, in the case of the mark length recording method, the data is reproduced by detecting both end portions (that is, an edge) of the mark and detecting the length of the mark, on the other hand, in the case of the mark space recording method, the data is reproduced by detecting the position of the mark.

By the way, even if one of two methods is proposed, in the magneto-optical disc apparatus, the mark is formed by radiating the laser beam on the magnetic film and raising the temperature of the magnetic film to reach or exceed the Curie point, thereby the data recording is carried out. Therefore, the temperature of the magneto-optical disc is an important factor on recording.

For example, in the magneto-optical disc apparatus having the mark length recording method, in the case where a mark having a predetermined length is formed by radiating the laser beam, a temperature rise tends to be small at the time of starting radiating because thermal diffusion occurs all around, on the contrary, the temperature rise tends to be large after radiating continuously for a certain period of time because of thermal conduction caused by radiating before that. Therefore, if the recording is carried out simply, as shown in FIG. 1, a width of a latter portion of the mark spreads and the shape of the mark becomes a shape of a tear drop. In this way, if the shape of the mark becomes the shape of the tear drop, the edge can not be detected correctly, thus a data error occurs.

Therefore, in this type of the magneto-optical disc apparatus, the above problem is solved by adopting a multi-pulse recording method. In the multi-pulse recording method, as shown in FIG. 2, the temperature is risen quickly by continuously radiating the laser beam for a specified period of time at first, after that, the temperature is kept by intermittently radiating the laser beam in pulse. Therefore, by using the multi-pulse recording method, the temperature rise of the necessary temperature or more is suppressed, the tear drop shaping of the mark shown in FIG. 1 can be prevented.

In addition, a method has been proposed, in which an intensity of the laser beam (hereinafter, referred to as a laser power) is set to high comparatively in order to quickly raise the temperature at first, after that, the laser power is felt to suppress the temperature rise of the necessary temperature or more, thus the tear drop shaping is prevented.

By the way, the temperature of the magneto-optical disc is determined not only by the laser beam which is radiated, but also by the environmental temperature. Therefore, even if the temperature is adjusted by radiating the laser beam intermittently or by varying the laser power as described above, the temperature of the magneto-optical disc changes in accordance with the change of the environmental temperature. So that, the temperature rise of the necessary temperature or more occurs, or the necessary temperature rise can not be obtained. Thus a problem occurs, in which the shape of the mark can not be formed into a desired shape. For example, since the temperature of the magneto-optical disc just after setting is comparatively low, the temperature of the magnetic film is hard to rise to the Curie point or more even if the laser beam is radiated. As a result, the width and the length of the mark tends to be small. Further, since the temperature of the magneto-optical disc which has been set for a long time is comparatively high with the heat of the inside of the apparatus, the temperature of the magnetic film tends to rise to the Curie point or more when the laser beam is radiated. As a result, the width and the length of the mark tends to be large.

In this connection, if the length of the mark is not formed into a desired length, it causes the occurrence of the data error at reproducing. Further, if the width of the mark becomes large, the mark erases a mark in an adjacent track, thus high-density recording can not be performed.

Note that, a problem, in which the mark can not be formed into the desired shape because the temperature of the magneto-optical disc changes with the environmental temperature, occurs not only to the mark length recording method but also to the mark space recording method.

SUMMARY OF THE INVENTION

In view of the foregoing, an object of this invention is to provide an optical recording apparatus in which a shape of a mark which is a data recording area can be formed into a desired shape even if a temperature of an optical recording medium changes.

The foregoing object and other objects of the invention have been achieved by the provision of an optical recording apparatus which records am ark having a length determined based on recording data in the optical recording medium, the optical recording apparatus comprises: temperature detecting means for detecting the temperature of the optical recording medium; first laser power storing means for storing first laser power at a reference temperature; laser power adjusting means for adjusting the first laser power and second laser power, which is different from the first laser power, at the same ratio; and laser emitting means for emitting the laser beam on the optical recording medium, when a mark having at least a predetermined length or more is recorded in the optical recording medium, after changing the first and second laser power, adjusted by the laser power adjusting means, in a predetermined order determined based on the length of the mark.

In this way, the temperature of the optical recording medium is detected, and the first and second laser power are adjusted based on the detected temperature, and a mark is recorded in the optical recording medium by using the adjusted first laser power and the adjusted second laser power. Thereby, a recording operation can be performed with an optimum laser power based on the temperature of the optical recording medium even if the temperature of the optical recording medium changes with effect of the environmental temperature. Therefore, the shape of the mark which is a data recording area can be formed into a desired shape even if the temperature of the optical recording medium changes, thus the data error at reproducing can be suppressed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 3:
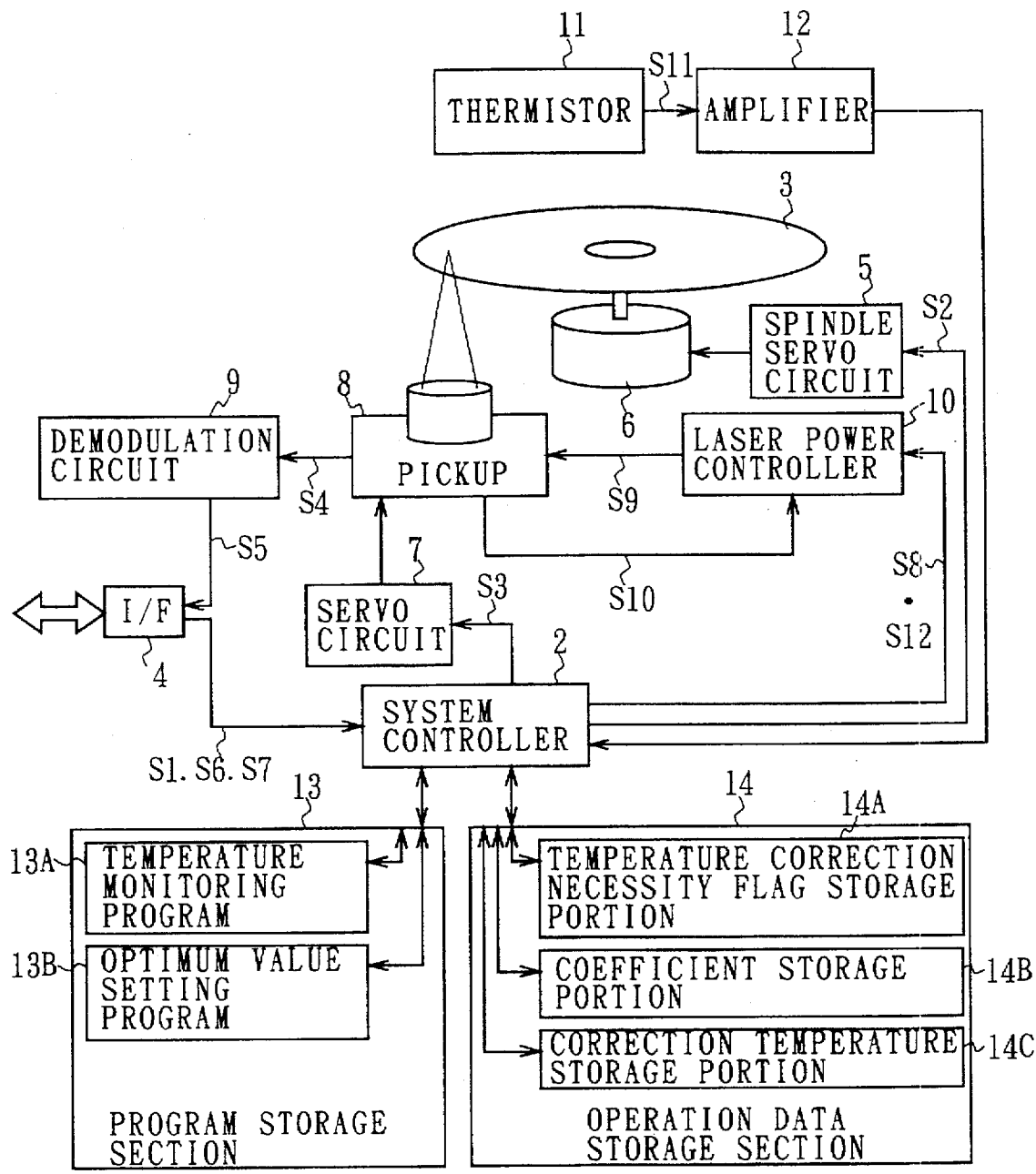
FIG. 3 is a block diagram showing the construction of the magneto-optical disc apparatus according to an embodiment of the present invention.

Preferred embodiments of this invention will be described with reference to the accompanying drawings:

In FIG. 3, numeral 1 generally shows a magneto-optical disc apparatus which applies the present invention. A system controller 2 controls the operation of each unit, thereby data recorded in a magneto-optical disc 3 is reproduced and data is recorded in the magneto-optical disc 3. The system controller 2 receives an operating instruction from an outside computer (not shown) through an interface circuit (I/F) 4, and then controls the operations of each unit on the basis of the operating instruction.

For example, when a reproduction instruction S1 is output from the computer, the reproduction instruction S1 is input to the interface circuit 4 at first. The interface circuit 4 supplies the reproduction instruction S1 to the system controller 2 to start a reproducing operation.

The system controller 2 which received the reproduction instruction S1 supplies a control signal S2 to a spindle servo circuit 5, thereby a spindle motor 6 is driven and then a magneto-optical disc 3 is spin-driven. At the same time, the system controller 2 supplies a control signal S3 to a servo circuit 7, thereby a pickup 8 is driven and then the recording data recorded in the magneto-optical disc 3 is read.

The pickup 8 is comprised of a laser diode and a photo detector. The pickup 8 emits a laser beam, radiated from the laser diode, on a track of the magneto-optical disc 3, and then the reflected light is received by the photo detector. Thereby the pickup 8 reads the recording data recorded in the magneto-optical disc 3 to generate a reproduction signal S4 based on the recording data. The reproduction signal S4 is supplied to a following demodulating circuit 9.

Since the recording data is generated by performing a predetermined modulation (for example, such as MFM or EFM) against data to be recorded, the demodulating circuit 9 performs a predetermined demodulation processing against the recording data to reproduce original data. A thus reproduced data S5 is output to the computer through the interface circuit 4.

On the other hand, when a recording instruction S6 is output from the computer, the interface circuit 4 receives the recording instruction S6 and supplies it to the system controller 2, thereby the system controller 2 starts a recording operation.

The system controller 2 supplies the control signal S2 to the spindle servo circuit 5 on the basis of the recording instruction S6, thereby the spindle motor 6 is driven and then the magneto-optical disc 3 is spin-driven. At the same time, the system controller 2 supplies the control signal S3 to the servo circuit 7, thereby the pickup 8 is driven. Further, the system controller 2 receives data S7 to be recorded, sent following the recording instruction S6, through the interface circuit 4. The data S7 to be recorded is modulated with the predetermined modulation (such as MFM or EFM described above) to generate recording data S8, and then the recording data S8 is supplied to a laser power controller 10.

The laser power controller 10 is a circuit for generating a driving signal S9 for driving the laser diode in the pickup 8, and generates the driving signal S9 based on the recording data S8 to supply the driving signal S9 to the laser diode. The laser diode emits the laser beam on the basis of the driving signal S9 to radiate the laser beam on a magnetic film of the magneto-optical disc 3 applied the magnetic field. Thereby a mark based on the recording data S8 is formed on the magnetic film to record the recording data S8 in the magneto-optical disc 3.

Note that, the reflected light from the magneto-optical disc 3 is received by the photo detector in the pickup 8, and then the received light result S10 is fed back into the laser power controller 10. The laser power controller 10 examines based on the received light result S10 whether the laser power is shifted with respect to an objective value, and if the laser power is shifted with respect to the objective value, the laser power is corrected.

By the way, in the magneto-optical disc apparatus 1, a thermistor 11 for detecting the temperature of the magneto-optical disc 3 is set near the magneto-optical disc 3, and the laser power at recording is controlled to an optimum value on the basis of the temperature of the magneto-optical disc 3 detected by the thermistor 11.

At first, a detection signal S11, measured by the thermistor 11, indicating the temperature of the magneto-optical disc 3 is amplified through the amplifier 12 to supply to the system controller 2.

The system controller 2 operates based on a temperature monitoring program 13A which is stored in a program storage section 13 comprising, for example, ROM, and detects the temperature of the magneto-optical disc 3 by examining the detection signal S11 with a predetermined period. As a result, in the case where the laser power needs to be corrected because the temperature of the magneto-optical disc 3 changes, a temperature correction necessity flag is set in a temperature correction necessity flag storage portion 14A of an operation data storage section 14 comprising, for example, RAM.

In addition, the system controller 2 operates based on an optimum value setting program 13B stored in the program storage section 13. At the time of performing the recording operation, the laser power at recording is set to an optimum value before the recording operation. In this case, the system controller 2 examines whether the flag is set in the temperature correction necessity flag storage portion 14A. As a result, if the flag is set, the laser power at recording is set to the optimum value by using a correction coefficient, etc., stored in a coefficient storage portion 14B of the operation data storage section 14.

Note that, especially, the setting of the laser power is performed by instructing the laser power optimum value (S12) from the system controller 2 to the laser power controller 10 before the recording operation. Thereby if the laser power controller 10 outputs the driving signal S9 based on the instruction, the laser beam having the optimum power is radiated from the laser diode.

In this connection, the system controller 2 stores the temperature data at the recording operation in the correction temperature storage portion 14C of the operation data storage section 14, and also examines the change of the temperature based on the temperature data to detect whether the temperature correction is necessary.

In this way, in the magneto-optical disc apparatus 1, a laser power adjusting means is comprised of the system controller 2, the program storage section 13, and the operation data storage section 14, and adjusts the laser power based on the temperature, detected by the thermistor 11, of the magneto-optical disc 3 so that the laser power having the adjusted power is emitted from the laser diode which makes up a laser emitting means. Thereby even if the temperature of the magneto-optical disc 3 changes, the shape of the mark can be formed into a predetermined shape by performing the recording operation with the optimum laser power.

Here, the setting of the laser power at recording will be hereinafter described.

Figure 4:
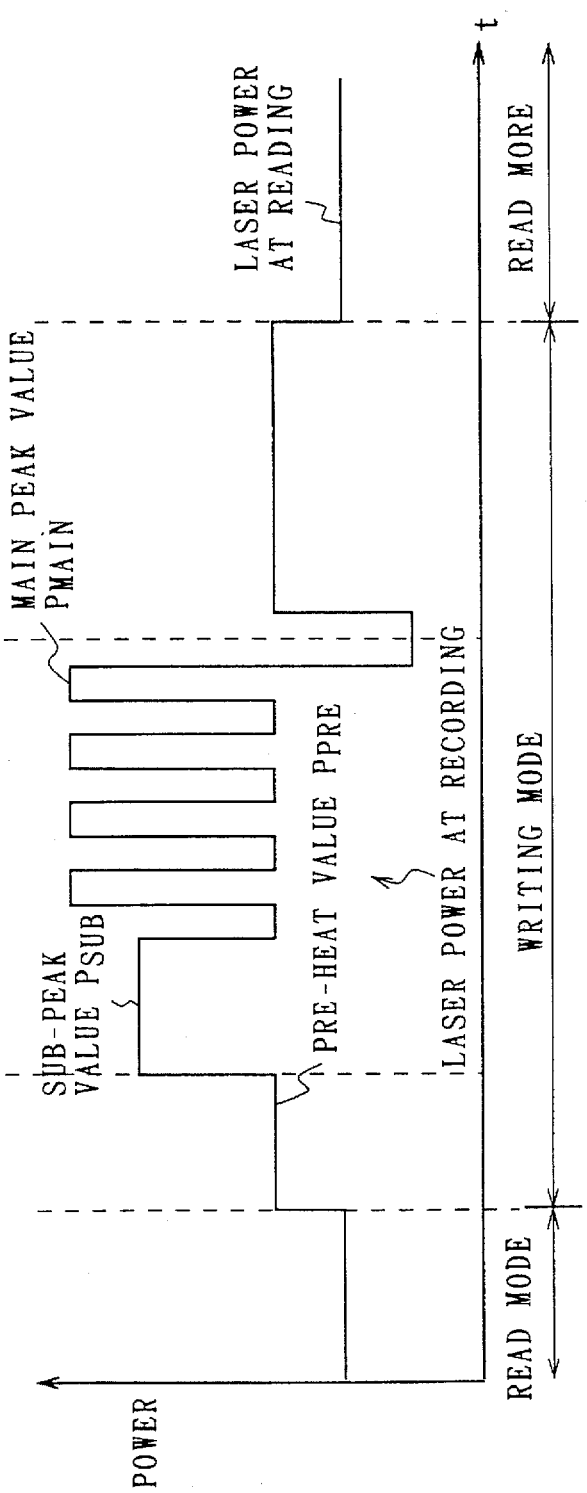
FIGS. 4A to 4D are schematic diagrams explaining mark length recording method and ternary multi-pulse recording method.

First, as shown FIGS. 4A to 4C, the magneto-optical disc apparatus 1 performs a data recording according to a mark length recording. For example, in the case where the recording data is "0,1,0,0,0,0,0,1,0", with a period from the logic "1" to the next logic "1" of the recording data as a timing for forming a mark, the mark having the length determined based on the period is formed.

Figure 1:
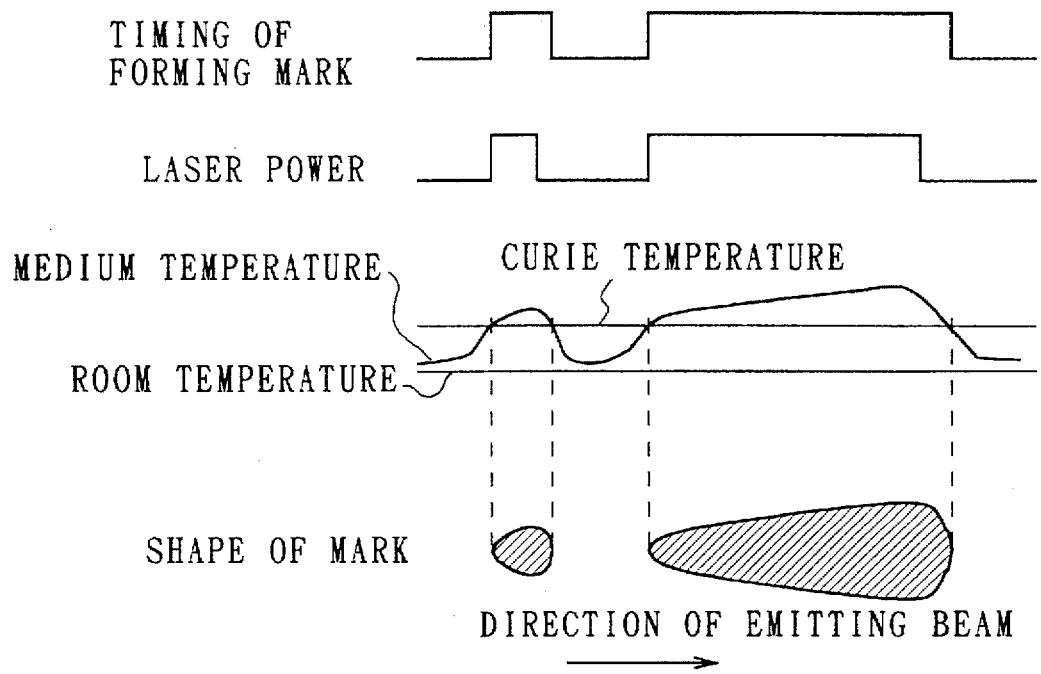
FIG. 1 is a schematic diagram explaining teardrop shaping of a mark according to the prior recording method.
Figure 2:
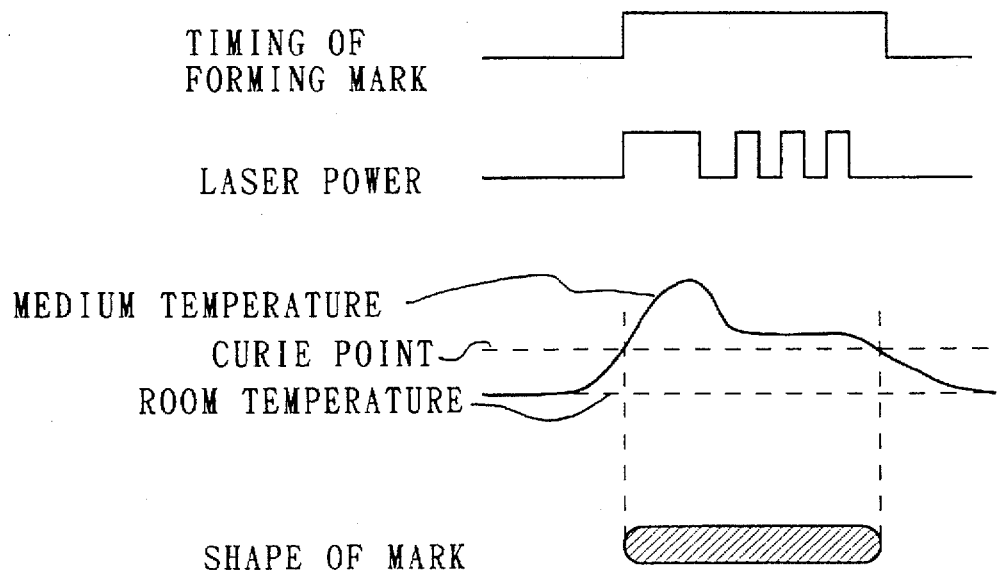
FIG. 2 is a schematic diagram explaining the theory of the prior multi-pulse recording method.

Further in the case of forming the mark, as shown in FIG. 4D, the power of the laser beam which is radiated on the magneto-optical disc 3 is recorded by using a multi-pulse recording method for changing in a predetermined order on the basis of length of the mark which is recorded, thereby the temperature rise of necessary temperature or more is suppressed to prevent a mark from the teardrop shaping as shown in FIG. 1.

Note that, the multi-pulse recording method is a ternary multi-pulse recording method which can take three values as a laser power. A first value out of the ternary value is a pre-heat value $P_{PRE}$ which is first applied for spare-heating the magnetic film preparing for the recording. Further a second value is a sub-peak value $P_{SUB}$ which is applied following the pre-heat value $P_{PRE}$ when a mark having a length of a minimum period "2T" with a base unit period of the data recording as "T". Furthermore, a third value is a main peak value $P_{MAIN}$ having maximum power which is applied following the sub-peak value $P_{SUB}$ when a mark having a length of "3T" or more is recorded.

In this connection, the laser power is lowered to a value lower than the power at reading at a timing earlier by 0.5 T than a mark end terminal portion when any mark having any length is recorded. In this time, the mark end terminal portion is formed into a predetermined length by after heat.

Note that, as shown in FIG. 4D, the laser power having a value lower than the pre-heat value $P_{PRE}$ is used at reading.

Here, in the case of the magneto-optical disc apparatus 1, the main peak value $P_{MAIN}$ is stored as a reference value of the laser power at the time of recording, the pre-heat value $P_{PRE}$ and the sub-peak value $P_{SUB}$ are calculated based on the main-peak value $P_{MAIN}$ by using a predetermined level relation equation. Specially, the pre-heat value $P_{PRE}$ is calculated by using a coefficient "$\alpha$" ($0<\alpha$) in accordance with the following equation (1).

$$P_{PRE} = \alpha \cdot P_{MAIN} \quad (1)$$

Further the sub-peak value $P_{PRE}$ is calculated by using a coefficient "$\beta$" ($\alpha<\beta<1$) in accordance with the following equation (2).

$$P_{SUB} = \beta \cdot P_{MAIN} \quad (2)$$

Note that, the value at a reference temperature (for example, 35 degree) is set as the main peak value $P_{MAIN}$, and the value is stored in the laser power storage area of the coefficient storage portion 14B. Further, the coefficients $\alpha$ and $\beta$ indicating the level relation between the pre-heat value $P_{PRE}$ and the sub-peak value $P_{SUB}$ are stored in the level relation data storage area of the coefficient storage portion 14B.

Further, in the magneto-optical disc apparatus 1, the laser power is adjusted according to the detected temperature of the magneto-optical disc 3 detected by using the thermistor 11 as described above. In this time, the main peak value $P_{MAIN}$ is adjusted at first. Specially, the main peak value $P_{MAIN}$ is adjusted by calculating the following equation (3) using the detected temperature "TP" and the correction coefficient $\gamma$ ($0<\gamma$) in order to set an optimum value to the main-peak value $P_{MAIN}$ according to the detected temperature.

$$P_{MAIN}' = P_{MAIN} - \gamma \cdot (TP - 35 \text{ degree}) \quad (3)$$

Next, the pre-heat value $P_{PRE}$ and the sub-peak value $P_{SUB}$ are obtained by calculating the aforesaid equations (1) and (2) using the adjusted main-peak value $P_{MAIN}$. Thereby the pre-heat value $P_{PRE}$ and the sub-peak value $P_{SUB}$ are adjusted with the same ratio as that of the main-peak value $P_{MAIN}$ according to the detected temperature to set an optimum value.

In this connection, the data of the correcting coefficient $\gamma$ which is used for adjusting the main peak value $P_{MAIN}$ is stored in the correction coefficient storage area of the coefficient storage portion 14B.

In such way, in the magneto-optical disc apparatus 1, the main-peak value $P_{MAIN}$ is adjusted to the optimum value according to the detected temperature of the magneto-optical disc 3, and the pre-heat value $P_{PRE}$ and the sub-peak value $P_{SUB}$ are adjusted to the optimum value according to the main peak value $P_{MAIN}$. Thereby even if the temperature of the magneto-optical disc 3 changes, the optimum shape of the mark comprising a predetermined width and length determined based on the recording data can be formed.

Figure 6:
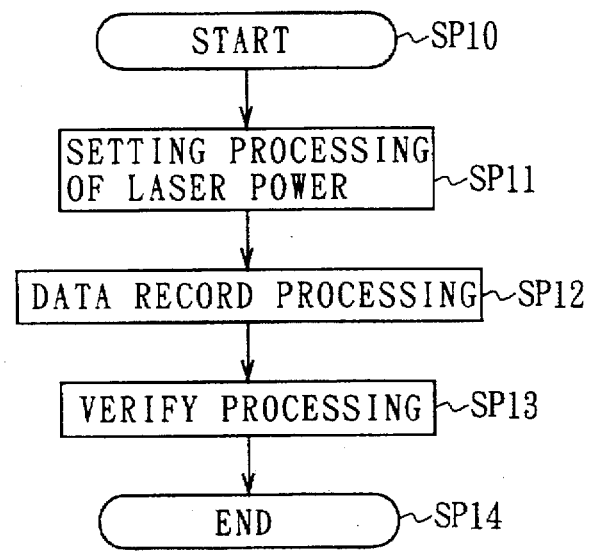
FIG. 6 is a flow chart explaining a procedure of a whole recording operation.
Figure 9:
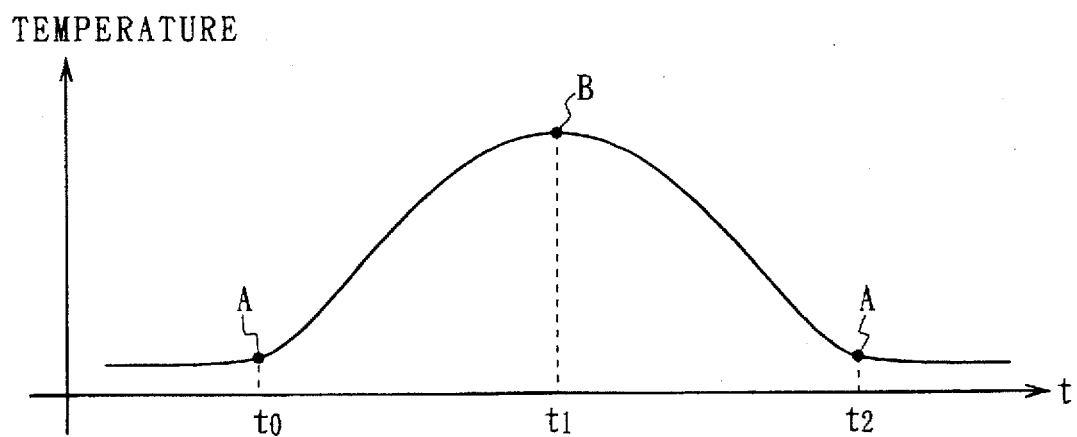
FIG. 9 is a schematic diagram explaining the laser power correction with respect to the temperature fluctuation.
Figure 7:
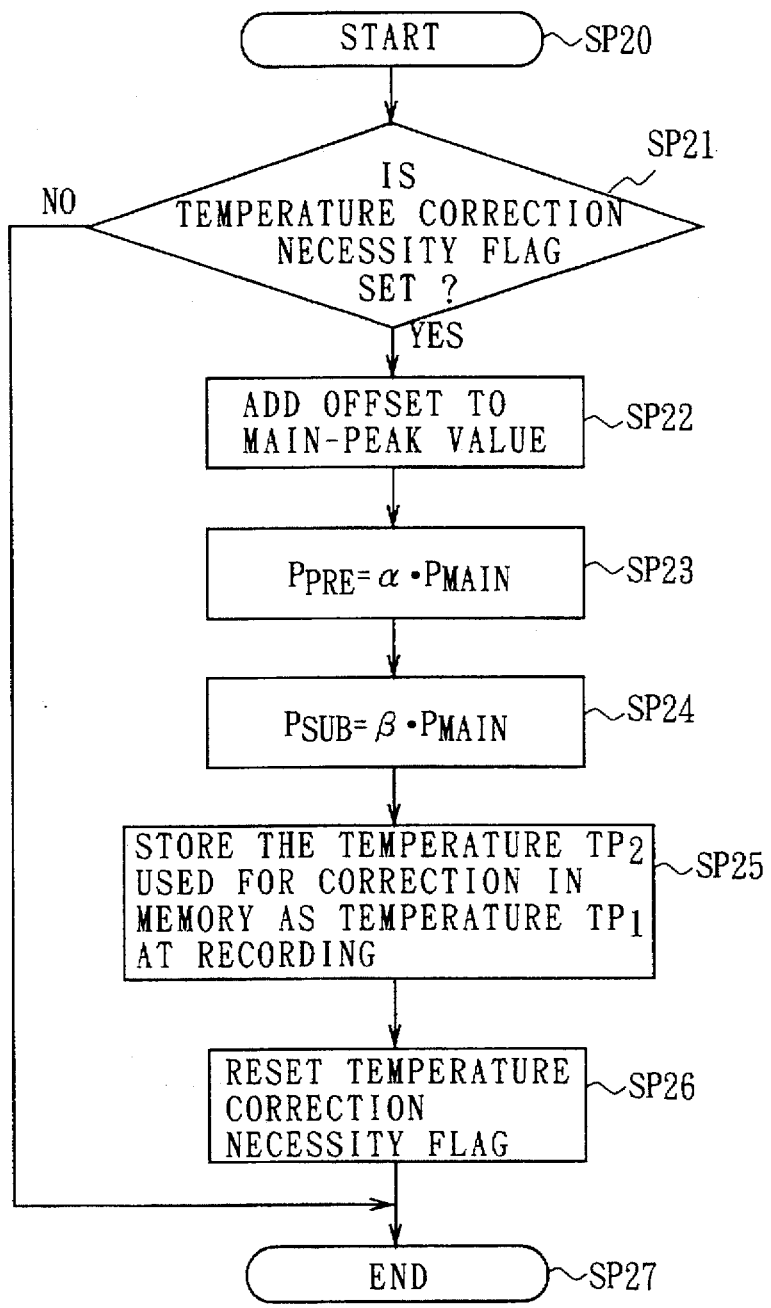
FIG. 7 is a flow chart explaining the setting procedure of the laser power.

Here, the setting procedure of the laser power will be hereinafter described by using the flow charts of FIGS. 5–7.

In the magneto-optical disc apparatus 1, the temperature monitoring program 13A is started, and detects the temperature of the magneto-optical disc 3 with a predetermined period and then examines whether the temperature correction of the laser power is necessary. In the case of performing the recording operation, the optimum value setting program 13B is started, and performs the temperature correction of the laser power on the basis of the judgment result of the temperature monitoring program 13A. Therefore, the magneto-optical disc apparatus 1 sets the optimum values to the aforesaid main-peak value $P_{MAIN}$, pre-heat value $P_{PRE}$, and sub-peak value $P_{SUB}$, and then sets the optimum value to the laser power according to the temperature of the magneto-optical disc 3.

Figure 5:
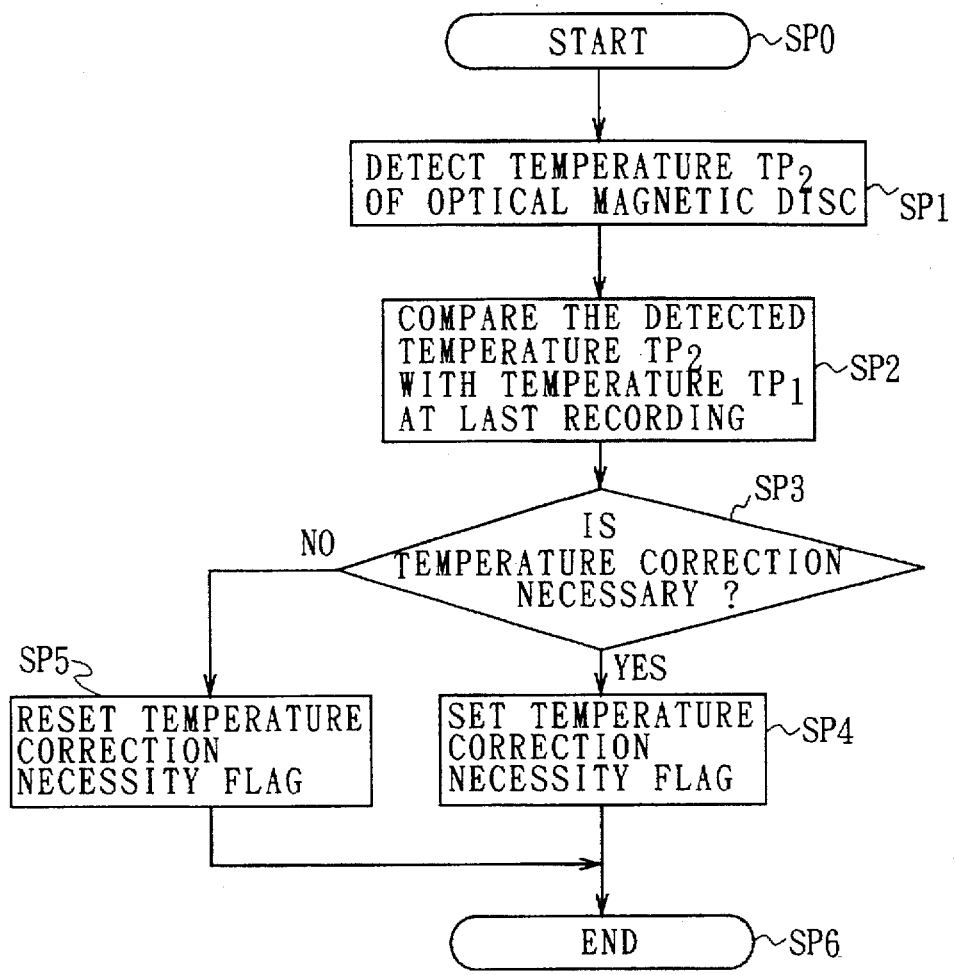
FIG. 5 is a flow chart explaining a procedure for detecting the temperature of the magneto-optical disc.

First, the system controller 2 in the magneto-optical disc apparatus 1 starts the temperature monitoring program 13A and carries out the processing shown in FIG. 5 every a predetermined period (for example, one second). That is, the system controller 2 reads the detected signal S11 indicating the temperature of the magneto-optical disc 3 measured by the thermistor 11 and detects the temperature of the magneto-optical disc 3 on the basis of the detected signal S11 at step SP1 following step SP0. At next step SP2, the system controller 2 reads the temperature which is set at the laser power setting procedure described later, that is, the temperature "TP$_1$" at the last recording, from the correction temperature storage portion 14C, and compares the detected temperature "TP$_2$" detected at step SP1 with the temperature "TP$_1$" to calculate the temperature difference. Note that, in the case where passing step SP2 is passed without performing the recording operation, the reference temperature, for example, 35 degrees is used as the temperature "TP$_1$".

At next step SP3, the system controller 2 detects whether the temperature difference is more than a predetermined threshold value. If the temperature difference is the threshold value or more, the system controller 2 determines that the temperature correction is necessary and then proceeds to step SP4. On the contrary, if the temperature difference is less than the threshold value, the system controller 2 determines that the temperature correction is unnecessary and then proceeds to step SP5.

At step SP4, the system controller 2 set the temperature correction necessity flag in the temperature correction necessity flag storage portion 14A (for example, a logic "1" is set), and stores the data of the detected temperature "TP$_2$" in the temperature correction necessity flag storage portion 14A.

On the other hand, at step SP5, the system controller 2 resets the temperature correction necessity flag (for example, a logic "0" is set). Note that, at this time, the data of the detected temperature "TP$_2$" is not stored in the temperature correction necessity flag storage portion 14A.

When the processing of step SP4 or SP5 is finished, the system controller 2 proceeds to next step SP6 and the processing is finished.

Next, the operation at recording will, be hereinafter described. When the system controller 2 receives the recording instruction S6 from the interface circuit 4, the processing shown in FIG. 6 is carried out as a recording operation. That is, at step SP11 following step SP10, the system controller 2 performs the laser power setting processing described later before the recording operation in order to set an optimum laser power. Then at next step SP12, the recording operation is performed by using the optimum laser power. After finishing the recording operation, at next step SP13, the system controller 2 performs a verify processing to examine whether the recording operation is normally performed. If it is normal, the step proceeds to next step SP14 and the recording operation is finished.

Here, the laser power setting processing shown in step SP11 will be hereinafter described. The system controller 2 starts the optimum value setting program 13B and performs the processing procedure shown in FIG. 7 to set the laser power. That is, at step SP21 following step SP20, the system controller 2 examines the temperature correction necessity flag storage portion 14A to detect whether the temperature correction necessity flag is set. At a result, if the temperature correction necessity flag is set, the system controller 2 determines that the temperature correction is necessary and proceeds to next step SP22. Here, an off-set based on the detected temperature is added to the main peak value $P_{MAIN}$. That is, the correction coefficient γ is read from the coefficient storage portion 14B, and the detected temperature "TP$_2$" at the time of setting the flag is read from the temperature correction necessity flag storage portion 14A, and then the main-peak value $P_{MAIN}$ is adjusted to the optimum value by performing the calculation shown in the aforesaid equation (3) using the correction coefficient γ and the detected temperature "TP$_2$".

Note that, the main-peak value $P_{MAIN}$ used at the equation (3) is a value with the reference temperature of 35 degrees, for example, it is set to 8.7 [mW]. Further, by calculating the equation (3), for example, in the case where the reference temperature is 45 degrees, the main-peak value $P_{MAIN}$ is adjusted to 8 [mW]. And in the case where the reference temperature is 5 degrees, the main-peak $P_{MAIN}$ is adjusted to 10 [mW].

At next step SP23, the system controller 2 reads the coefficient α from the coefficient storage portion 14B, and calculates the aforesaid equation (1) using the adjusted main-peak value $P_{MAIN}$ to obtain the optimum pre-heat value $P_{PRE}$ based on the detected temperature.

At next step SP24, the system controller 2 reads the coefficient α from the coefficient storage portion 14B, and calculates the aforesaid equation (2) using the adjusted main-peak value $P_{MAIN}$ to obtain the optimum sub-peak value $P_{SUB}$ based on the detected temperature.

In this connection, thus calculated main-peak value $P_{MAIN}$, pre-heat value $P_{PRE}$, and sub-peak value $P_{SUB}$ are instructed to the laser power controller 10 respectively. Thereby the optimum laser power based on the detected temperature is set.

At next step SP25, the system controller 2 stores the temperature data (that is, the detected temperature TP$_2$), used for the calculation of the equation (3), to the correction temperature storage portion 14C as the temperature TP$_1$ at recording. At next step SP26, the system controller 2 resets the temperature correction necessity flag. After that, the system controller 2 proceeds to step SP27, and the processing is finished.

On the other hand, at step SP21, if the temperature correction necessity flag is not set, the step proceeds to step SP27 and the processing is finished. Note that, in this case, the main-peak value $P_{MAIN}$, the pre-heat value $P_{PRE}$, the sub-peak value $P_{SUB}$, and temperature TP$_1$ at recording are kept at the values last set. That is, if the temperature correction necessity flag is not set, since the temperature correction is unnecessary, the main peak value $P_{MAIN}$, the pre-heat value $P_{PRE}$, and the sub-peak value $P_{SUB}$ used for the last recording are used as they are.

In this way, in the magneto-optical disc apparatus 1, if the temperature correction necessity flag is set at the time of instructing the recording instruction S6, the main-peak value $P_{MAIN}$, the pre-heat value $P_{PRE}$, and the sub-peak value $P_{SUB}$ are calculated based on the temperature of the detected magneto-optical disc 3 to set the optimum value as the laser power.

Figure 8A:
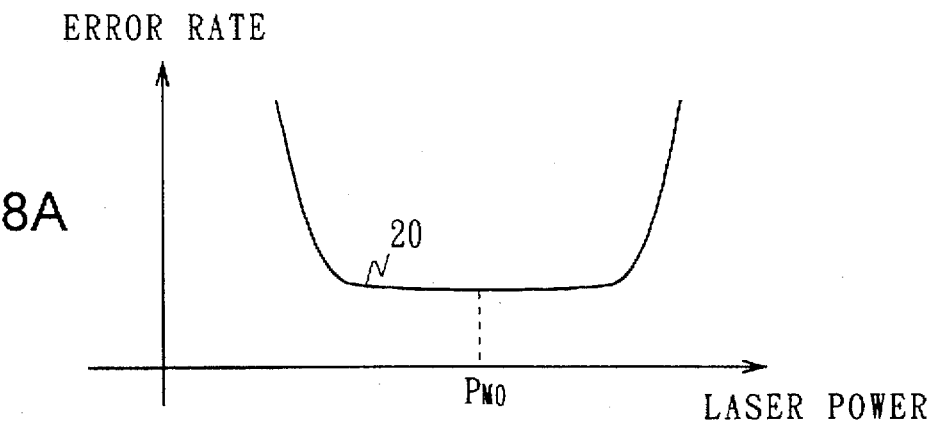
FIGS. 8A to 8C are characteristic curve diagrams showing the characteristics of error rate relative to laser power at recording.

According to the aforesaid configuration, the case where the temperature of the magneto-optical disc 3 decreases or increases will be considered. At fist, the value $P_{MO}$, which is a minimum value of the error rate which exists at the center of the characteristic curve 20 of the error rate relative to the laser power at recording, is set as the main-peak value $P_{MAIN}$ at the reference temperature as shown in FIG. 8A.

Figure 8B:
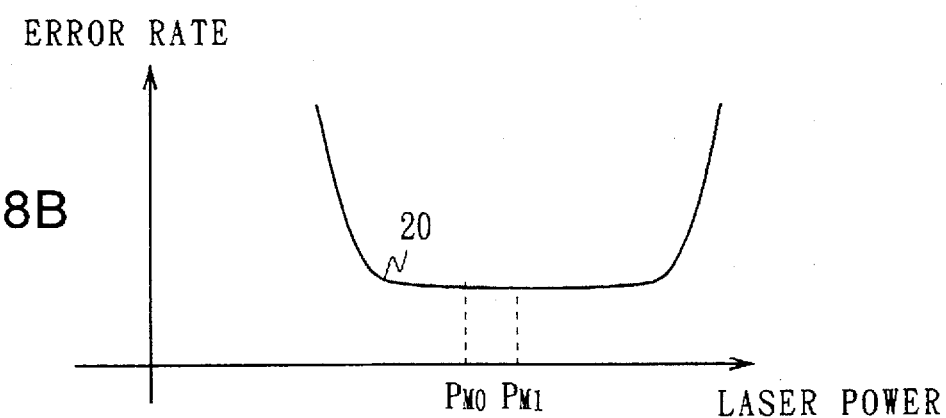

Here, if the temperature of the magneto-optical disc 3 decreases in comparison with the reference temperature, as shown in FIG. 8B, the characteristic curve 20 of the error rate relative to the laser power is displaced to the right side on the page as a whole. That is, the laser power which is the minimum value of the error rate becomes higher than the value $P_{MO}$ and changes to the value $P_{M1}$. In this time, the magneto-optical disc apparatus 1 offsets by performing the correction based on the aforesaid equation (3) so that the main-peak value $P_{MAIN}$ increases, to thereby set a new optimum value $P_{M1}$ as the main-peak value $P_{MAIN}$. Therefore, in the case where the temperature decreases, an optimum value can be maintained as the main-peak value $P_{MAIN}$, and the pre-heat value $P_{PRE}$ and the sub-peak value $P_{SUB}$, calculated on the basis of the main-peak value $P_{MAIN}$, can be also maintained.

Figure 8C:
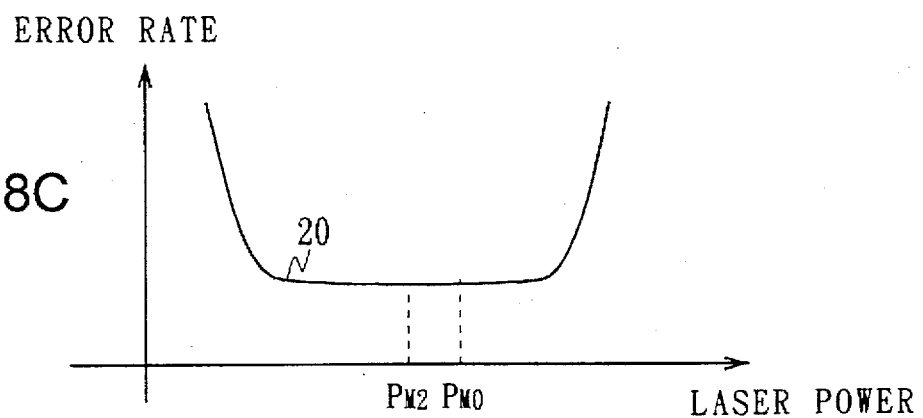

On the other hand, if the temperature of the magneto-optical disc 3 increases in comparison with the reference temperature, as shown in FIG. 8C, the characteristic curve 20 of the error rate relative to the laser power is replaced to the left side on the page as a whole. That is, the value of the laser power which is the minimum value of the error rate becomes lower than the value $P_{MO}$ and changes to a value $P_{M2}$. In this case also, the magneto-optical disc apparatus 1 offsets by performing the correction based on the aforesaid equation (3) so that the main-peak value $P_{MAIN}$ decreases, and a new optimum value $P_{M2}$ is set as the main peak value $P_{MAIN}$. Thereby in the case where the temperature increases, the optimum value can be maintained as the main-peak value $P_{MAIN}$, and the pre-heat value $P_{PRE}$ and the sub-heat value $P_{SUB}$, calculated on the basis of the main-peak value $P_{MAIN}$, can be also maintained.

In this way, in the magneto-optical disc apparatus 1, the temperature of the magneto-optical disc 3 is detected, then the main-peak value $P_{MAIN}$ at recording is adjusted according to the detected temperature, and the pre-heat value $P_{PRE}$ and the sub-peak value $P_{SUB}$ are also adjusted in proportion to the main-peak value $P_{MAIN}$. Therefore, in the case where the temperature of the magneto-optical disc 3 changes, a mark at recording can be formed into a desired shape. Further, the mark can be formed into the desired shape at recording, so that it is possible to minimize the occurrence of the data error at reproducing.

Next, the case where the temperature fluctuation occurs in the magneto-optical disc 3 will be considered. That is, it is assumed that temperature "A" is detected at time t0, the laser power at recording is corrected relative to the temperature "A", the temperature of the magneto-optical disc 3 increases to temperature "B" at time t1, and returns to the temperature "A" at time t2 again. If the time t1 is just before recording, since the temperature correction necessity flag has been set already, the laser power is corrected relative to the temperature "B", and then the recording operation is carried out with the corrected laser power.

On the other hand, if the time t1 is not just before recording but the time t2 is just before recording, since the temperature correction necessity flag is reset, at this time, the recording operation is carried out by using the laser power, set last, based on the temperature "A" without the temperature correction. That is, in the magneto-optical disc apparatus 1, since the temperature correction of the laser power is carried out just before the recording, the temperature correction is not carried out when the temperature fluctuation of the magneto-optical disc 3 merely occurs. Therefore, the magneto-optical disc apparatus 1 performs the temperature correction when necessary, thus trouble of performing the temperature correction can be decreased.

According to the aforesaid configuration, the temperature correction of the magneto-optical disc 3 is detected, and then the main-peak value $P_{SUB}$ at recording is adjusted to the optimum value according to the detected temperature, and the pre-heat value $P_{PRE}$ and the sub-peak $P_{SUB}$ are adjusted to the optimum values in proportion to the main-peak value $P_{MAIN}$. Thereby, in the case where the temperature of the magneto-optical disc 3 changes, the mark can be formed with the optimum laser power, and the mark at recording can be formed into a desired shape.

Note that, in the aforesaid embodiment, the temperature of the magneto-optical disc 3 is detected by using the thermistor 11, the present invention is not limited thereto and the temperature of the magneto-optical disc 3 can be detected by using a temperature IC. As long as the temperature of the magneto-optical disc is detected by using a predetermined temperature detecting means, the same advantage as the aforesaid embodiment can be obtained.

Further, in the aforesaid embodiment, the recording is performed by using the ternary multi-pulse recording system, the present invention is not limited thereto and the recording can be performed by using a binary or quaternary multi-pulse recording system. As the aforesaid embodiment, as long as the laser power at recording is adjusted according to the temperature of the magneto-optical disc, the same advantage as the aforesaid embodiment can be obtained.

Further, in the aforesaid embodiment, the main-peak value $P_{MAIN}$ is stored, the pre-heat value $P_{PRE}$ and the sub-peak value $P_{SUB}$ are calculated by using the coefficients $\alpha$ and $\beta$ indicating a level relation, the present invention is not limited thereto and the sub-peak value $P_{SUB}$ is stored, the pre-heat value $P_{PRE}$ and the main-peak value $P_{MAIN}$ can be calculated by using coefficients indicating the level relation.

Further, in the aforesaid embodiment, the coefficients $\alpha$ and $\beta$ indicating the level relation and the correction coefficient $\gamma$ are constant, the present invention is not limited thereto and the kind of the disc is distinguished by reading information such as a disc vendor, and then the coefficients $\alpha$ and $\beta$ indicating the level relation and the correction coefficient $\gamma$ can be changed according to the kind of the disc. In this way, further optimum values can be set to the main-peak value $P_{MAIN}$, the pre-heat value $P_{PRE}$, and the sub-peak value $P_{SUB}$.

Further, in the aforesaid embodiment, the laser power is adjusted at recording, the present invention is not limited thereto and the laser power can be adjusted at the time of erasing data. Because the data erasing arranges the direction of the magnetism by recording sequential "0" or "1", the data erasing is almost the same as the recording operation.

Further, in the aforesaid embodiment, the present invention is applied to the magneto-optical disc apparatus 1 which records by using the mark length recording system in which a length of a mark is changed according to recording data, the present invention is not limited thereto and the present invention can be applied to a magneto-optical disc apparatus which records by using the mark space recording system in which a position of a mark is changed according to the recording data.

Furthermore, in the aforesaid embodiment, the present invention is applied to the magneto-optical disc apparatus i which records data on the magneto-optical disc 3 on which possible to rewrite data, the present invention is not limited thereto and the present invention can be applied to an optical disc apparatus which records the data on a disc impossible to rewrite data, that is, a write-once-disc. As long as an optical recording apparatus which records the recording data in an optical recording medium by using the laser beam, the present invention can be applied to various kinds of apparatuses.

As described above, according to the present invention, the temperature of the optical recording medium is detected, and then the first and second laser power are adjusted based on the detected temperature, and a mark is recorded in the optical recording medium by using the adjusted first and second laser power. Therefore, even if the temperature of the optical recording medium changes, the mark can be recorded with an optimum laser power and the shape of the mark can be formed into a desired shape. Thus, even if the temperature of the optical recording medium changes, an optical recording apparatus which can form the shape of the mark, which is a data recording area, into the desired shape can be easily realized.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An optical recording apparatus for recording a mark having a length determined based on recording data in an optical recording medium, said optical recording apparatus comprising:

temperature detecting means for detecting a temperature of said optical recording medium;

first laser power storing means for storing a first peak value of a first laser power at a reference temperature;

laser power adjusting means for adjusting said first peak value and a second peak value of a second laser power, said second peak value being different from said first peak value, at a same ratio on the basis of the temperature detected by said temperature detecting means; and laser emitting means for emitting a laser beam on said optical recording medium, wherein when a mark having at least a predetermined length is recorded in said optical recording medium, said first peak value and said second peak value are adjusted by said laser power adjusting means in a predetermined order, said predetermined order being determined based on the length of the mark.

2. An optical recording apparatus for recording a mark having a length determined based on recording data in an optical recording medium, said optical recording apparatus comprising:

temperature detecting means for detecting a temperature of said optical recording medium;

first laser power storing means for storing a first laser power at a reference temperature;

laser power adjusting means for adjusting said first laser power and a second laser power, said second laser power being different from said first laser power, at a same ratio on the basis of the temperature detected by said temperature detecting means, said laser power adjusting means comprising:

correction coefficient storing means for storing correction coefficient data indicating correction coefficients for adjusting said first laser power based on a difference between said reference temperature and said detected temperature, level relation data storing means for storing level relation data indicating a level relation between said first laser power and said second laser power, and laser power calculating means for calculating optimum values of said first laser power and said second laser power for recording the mark by using said correction coefficient data and said level relation data on the basis of the temperature detected by said temperature detecting means, before the mark is recorded in said optical recording medium by said laser emitting means; and laser emitting means for emitting a laser beam on said optical recording medium, wherein when a mark having at least a predetermined length is recorded in said optical recording medium, said first laser power and said second laser power are adjusted by said laser power adjusting means in a predetermined order, said predetermined order being determined based on the length of the mark.

3. The optical recording apparatus according to claim 2, further comprising:

recording temperature data storing means for storing recording temperature data indicating the temperature detected by said temperature detecting means at a time of last recording the mark in said optical recording medium;

flag setting means for detecting, at a predetermined period, whether the difference between the detected temperature at said temperature detecting means and the temperature indicated by said recording temperature data is more than a threshold value, and then setting a temperature correction necessity flag if the difference is the threshold value or more, or resetting the temperature correction necessity flag if the difference is less than the threshold value; and record instructing means for instructing said optical recording apparatus to record said mark in said optical recording medium, wherein said laser power adjusting means operates said laser power calculating means, in the case where said temperature correction necessity flag is set when said record instructing means operates.

4. The optical recording apparatus according to claim 1, wherein:

said first peak value indicates a main-peak value on a ternary multi-pulse recording system; and said second peak value indicates a sub-peak value and a pre-heat value on said ternary multi-pulse recording system.

5. A method for recording a mark having a length determined based on recording data in an optical recording medium, comprising the steps of:

detecting a temperature of said optical recording medium;

storing a first peak value of a first laser power at a reference temperature;

adjusting said first peak value and a second peak value of a second laser power, said second peak value being different from said first peak value, at a same ratio on the basis of the temperature detected in said detecting step; and emitting a laser beam on said optical recording medium, wherein when a mark having at least a predetermined length is recorded in said optical recording medium, said first peak value and said second peak value are adjusted in said adjusting step in a predetermined order, said predetermined order being determined based on the length of the mark.

6. A method for recording a mark having a length determined based on recording data in an optical recording medium, comprising the steps of:

detecting a temperature of said optical recording medium;

storing a first laser power at a reference temperature;

adjusting said first laser power and a second laser power, said second laser power being different from said first laser power, at a same ratio on the basis of the temperature detected in said detecting step, wherein said adjusting step comprises the steps of:

storing correction coefficient data indicating correction coefficients for adjusting said first laser power based on a difference between said reference temperature and said detected temperature, storing level relation data indicating a level relation between said first laser power and said second laser power, and calculating optimum values of said first laser power and said second laser power for recording the mark by using said correction coefficient data and said level relation data on the basis of the temperature detected in said detecting step; and emitting a laser beam on said optical recording medium, wherein when a mark having at least a predetermined length is recorded in said optical recording medium, said first laser power and said second laser power are adjusted in said adjusting step in a predetermined order, said predetermined order being determined based on the length of the mark.

7. The method according to claim 6, further comprising the steps of:

storing recorded temperature data indicating the temperature detected by said temperature detecting means at a time of last recording the mark in said optical recording medium;

detecting, at a predetermined period, whether the difference between the detected temperature in said detecting step and the temperature indicated by said recorded temperature data is more than a threshold value, and then setting a temperature correction necessity flag if the difference is the threshold value or more, or resetting the temperature correction necessity flag if the difference is less than the threshold value; and instructing said optical recording method to begin, wherein said adjusting step operates said calculating step, in the case where said temperature correction necessity flag is set when said instructing step causes said optical recording method to begin.

8. The optical recording method according to claim 5, wherein said first peak value indicates a main-peak value on a ternary multi-pulse recording system, and said second peak value indicates a sub-peak value and a pre-heat value on said ternary multi-pulse recording system.

* * * * *